US010218635B2

(12) United States Patent
Aldebert et al.

(10) Patent No.: US 10,218,635 B2
(45) Date of Patent: *Feb. 26, 2019

(54) NETWORK CONTROLLER-SIDEBAND INTERFACE PORT CONTROLLER

(71) Applicant: International Business Machines Corporation, Armonk, NY (US)

(72) Inventors: Jean-Paul Aldebert, Biot (FR); Claude Basso, Nice (FR); Jean-Luc Frenoy, Cagnes sur Mer (FR); Fabrice J. Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 218 days.

This patent is subject to a terminal disclaimer.

(21) Appl. No.: 14/857,952

(22) Filed: Sep. 18, 2015

(65) Prior Publication Data

US 2016/0134552 A1 May 12, 2016

(30) Foreign Application Priority Data

Nov. 7, 2014 (GB) .................................. 1419818.8

(51) Int. Cl.
*H04L 29/06* (2006.01)
*H04L 12/855* (2013.01)
*H04L 12/927* (2013.01)

(52) U.S. Cl.
CPC ........ *H04L 47/801* (2013.01); *H04L 47/2466* (2013.01); *H04L 69/22* (2013.01)

(58) Field of Classification Search
None
See application file for complete search history.

(56) References Cited

U.S. PATENT DOCUMENTS 6,091,740 A 7/2000 Karasawa
7,594,095 B1 * 9/2009 Nordquist ............. G06F 9/4843
712/22

(Continued)

FOREIGN PATENT DOCUMENTS

EP 2669811 A1 12/2013
WO 2014150352 A1 9/2014

OTHER PUBLICATIONS

Abel et al., "Network Controller-Sideband Interface Port Controller," U.S. Appl. No. 14/929,447, filed Nov. 2, 2015.

(Continued)

*Primary Examiner* — Alex Skripnikov
*Assistant Examiner* — Nicole King
(74) *Attorney, Agent, or Firm* — Robert J. Shatto

(57) ABSTRACT

A network interface controller (NC) that can provide a connection for a device to a network. The NC can include a sideband port controller. The sideband port controller can provide a sideband connection between the network and a sideband endpoint circuit that can communicate information with the network via the sideband. The sideband port controller can include a receive data route that has an input for receiving packets of data from the network and an output for passing the packets of data received from the network to the sideband endpoint circuit. The receive data route may include a buffer to receive the packets of data from the network and to pass the packets of data received from the network to the sideband endpoint.

18 Claims, 7 Drawing Sheets

(56) References Cited

U.S. PATENT DOCUMENTS

| | | |
|---|---|---|
| 8,321,616 B2 | 11/2012 | Lambert et al. |
| 8,645,567 B2 | 2/2014 | Shah et al. |
| 2004/0047367 A1 | 3/2004 | Mammen |
| 2007/0115981 A1 | 5/2007 | Jreij et al. |
| 2009/0164690 A1 | 6/2009 | Slaight |
| 2009/0182799 A1 | 7/2009 | Huang |
| 2009/0210601 A1 | 8/2009 | Greenstein |
| 2010/0005190 A1 | 1/2010 | Shah et al. |
| 2010/0192218 A1 | 7/2010 | Shah et al. |
| 2011/0040917 A1 | 2/2011 | Lambert et al. |
| 2011/0058573 A1 | 3/2011 | Balakavi et al. |
| 2011/0078299 A1 | 3/2011 | Nagapudi et al. |
| 2011/0202685 A1 | 8/2011 | Subramaniam et al. |
| 2013/0080567 A1 | 3/2013 | Pope |
| 2013/0179566 A1 | 7/2013 | Jreij et al. |
| 2013/0326039 A1 | 12/2013 | Shah |
| 2014/0165183 A1 | 6/2014 | Dharmadhikari et al. |
| 2014/0344488 A1 | 11/2014 | Flynn et al. |
| 2015/0124649 A1 | 5/2015 | Itkin et al. |
| 2015/0205746 A1 | 7/2015 | Bailey et al. |
| 2015/0334018 A1 | 11/2015 | Kutch |
| 2016/0127171 A1 | 5/2016 | Kutch |
| 2017/0052913 A1 | 2/2017 | Aldebert et al. |
| 2017/0052914 A1 | 2/2017 | Aldebert et al. |

OTHER PUBLICATIONS

List of IBM Patents or Patent Applications Treated as Related, May 20, 2017, 2 pgs.

Great Britain Application No. GB1419819.6, Office Action, dated May 4, 2016, 1 pg.

Great Britain Application No. GB1419819.6, Response to Office Action, dated May 18, 2016, 1 pg.

Great Britain Application No. GB1419819.6, Specification Amendment, dated May 18, 2016, 1 pg.

Great Britain Application No. GB1419819.6, Claim Amendment, dated May 18, 2016, 1 pg.

Great Britain Application No. GB1419819.6, Notification of Grant, dated Sep. 13, 2016, 2 pgs.

Unknown, "NC-SI over MCTP Binding Specification," Distributed Management Task Force, Inc., Document No. DSP0261, Verson: 1.0.0, Aug. 22, 2013, 31 pages.

Unknown, "Network Controller Sideband Interface (NC-SI) Specification," Distributed Management Task Force, Inc., Document No. D5P0222, Version: 1.0.1, Jan. 24, 2013, 124 pages, Copyright © 2013 Distributed Management Task Force, Inc. (DMTF). All rights reserved.

GB Application 1419817.0, Entitled "NC-SI Port Controller," Filed Nov. 7, 2014.

International Search Report dated May 15, 2015 for International Application GB1419817.0.

Doty et al., "OS-to-BMC Pass-through: A New Chapter in System Manageability," A Dell Technical White Paper, 7 pages, Feb. 2012, Rev 1.0, © 2012 Dell Inc.

Intel, "Maintaining the Ethernet Link to the BMC During Server Power Actions," Using the Advanced Manageability Feature of Intel Ethernet Controllers, Intel® LAN Access Division, Revision 1.0, Oct. 2012, 11 pages, Copyright © 2008-2012. Intel Corporation.

GB Application 1419819.6, Entitled "NC-SI Port Controller," Filed Nov. 7, 2014.

International Search Report dated May 15, 2015 for International Application GB1419819.6.

GB Application 1419818.8, Entitled "NC-SI Port Controller," Filed Nov. 7, 2014.

International Search Report dated May 15, 2015 for International Application GB1419818.8.

Aldebert et al., "Network Controller-Sideband Interface Port Controller," U.S. Appl. No. 14/857,930, filed Sep. 18, 2015.

Aldebert et al., "Network Controller—Sideband Interface Port Controller," U.S. Appl. No. 14/857,978, filed Sep. 18, 2015.

Aldebert et al., "Network Controller—Sideband Interface Port Controller," U.S. Appl. No. 14/857,999, filed Sep. 18, 2015.

Abel et al., "Network Controller-Sideband Interface Port Controller," U.S. Appl. No. 14/858,013, filed Sep. 18, 2015.

List of IBM Patents or Patent Applications Treated as Related, Sep. 16, 2015, 2 pages.

List of IBM Patents or Patent Applications Treated as Related, Jan. 24, 2018, 2 pages.

Aldebert, et al., "Network Controller-Sideband Interface Port Controller," U.S. Appl. No. 15/880,179, filed Jan. 25, 2018.

* cited by examiner

|  | DA | | | | | | | CPT | ChID | | rsv | PLLen | SA | | | | | | | EtherType | | MCID | HR |
|---|---|---|---|---|---|---|---|---|---|---|---|---|---|---|---|---|---|---|---|---|---|---|---|
| QW0 | rsv | F F | F F | F F | F F | F F | F F | F F | F F | P | Ch | rsv | | F F | F F | F F | F F | F F | F F | 8 8 | F 8 | 0 0 | 0 1 |
| QW1 | rsv | | IID 0 0 | | | | | | | | | | | | | | rsv | | | | | | |
| QW2 | rsv | AEN TYPE | | | | Payload data | | | | | | | | | | | | | | | | | |
| QW3 | | | | Payload Pad Payload = Nx4B | | | | | | | | Checksum (optional) | | | | Ethernet Pad | | | | FCS | | | |

*FIG. 7*

NETWORK CONTROLLER-SIDEBAND INTERFACE PORT CONTROLLER

CROSS-REFERENCE TO RELATED APPLICATION

This application is related to and claims the benefit of United Kingdom Patent Application No. 1419818.8, filed Nov. 7, 2014, which application is incorporated by reference herein for all purposes.

BACKGROUND

Aspects of the present disclosure are related to handling of data traffic in relation to a network controller-sideband interface (NC-SI). In a computer or other network connected device (e.g. switches, routers, and network controllers) a baseboard management controller ("BMC") is a service processor or a microcontroller usually embedded on the motherboard of a server. The microcontroller uses sensors to report on matters such as temperature and fan speeds. The microcontroller may also control the operation of the system, including matters such as firmware updates, hardware configuration, power management, and monitoring. BMCs deployed in large network systems must be remotely accessible over the network, in particular via the network interface controller ("NC") of the managed device, or via a serial port connected to the microcontroller. An Intelligent Platform Management Interface ("IPMI") can specify a set of interfaces, protocols, and hardware buses for building such remote managed systems.

In such a network environment, the interface between the BMC and the NC can be referred to as the Network Controller-Sideband Interface (NC-SI). The NC-SI is a standardized interface that enables an NC to provide network access for a BMC, while allowing the NC to simultaneously and transparently provide network access for a host system. An NC-SI specification can define protocols and electrical specifications for a common Sideband Interface (SI) between a BMC and an 802.3 Local Area Network (LAN) via one or more external NCs. The NC-SI specification version 1.0.0 was published in July 2009 by the PMCI Working Group of the Distributed Management Task Force (DMTF).

SUMMARY

According to some embodiments of the present disclosure, aspects of the present disclosure may include a network interface controller (NC) that can provide a connection for a device to a network. The NC can include a sideband port controller. The sideband port controller can provide a sideband connection between the network and a sideband endpoint circuit that can communicate information with the network via the sideband. The sideband port controller can include a receive data route that has an input for receiving packets of data from the network and an output for passing the packets of data received from the network to the sideband endpoint circuit. The receive data route may comprise a buffer to receive the packets of data from the network and to pass the packets of data received from the network to the sideband endpoint.

According to some embodiments of the present disclosure, aspects of the present disclosure may include a method of transmitting data in a network interface controller that can provide a connection for a device to a network. The network interface controller circuit may comprise a sideband port controller. The sideband port controller may provide a sideband connection between the network and a sideband endpoint circuit that communicates information with the network via the sideband. The method may comprise receiving packets along a data route from an input to the sideband controller for receiving packets from the network to an output for passing the packets received from the network to the sideband endpoint circuit. The method may further comprise providing, in the receive data route, a buffer to receive the packets from the network and to pass the packets received from the network to the sideband endpoint.

BRIEF DESCRIPTION OF THE DRAWINGS

FIG. 7 illustrates a diagram of a structure of an AEN NC-SI packet, according to embodiments of the present disclosure.

DETAILED DESCRIPTION

Figure 1:
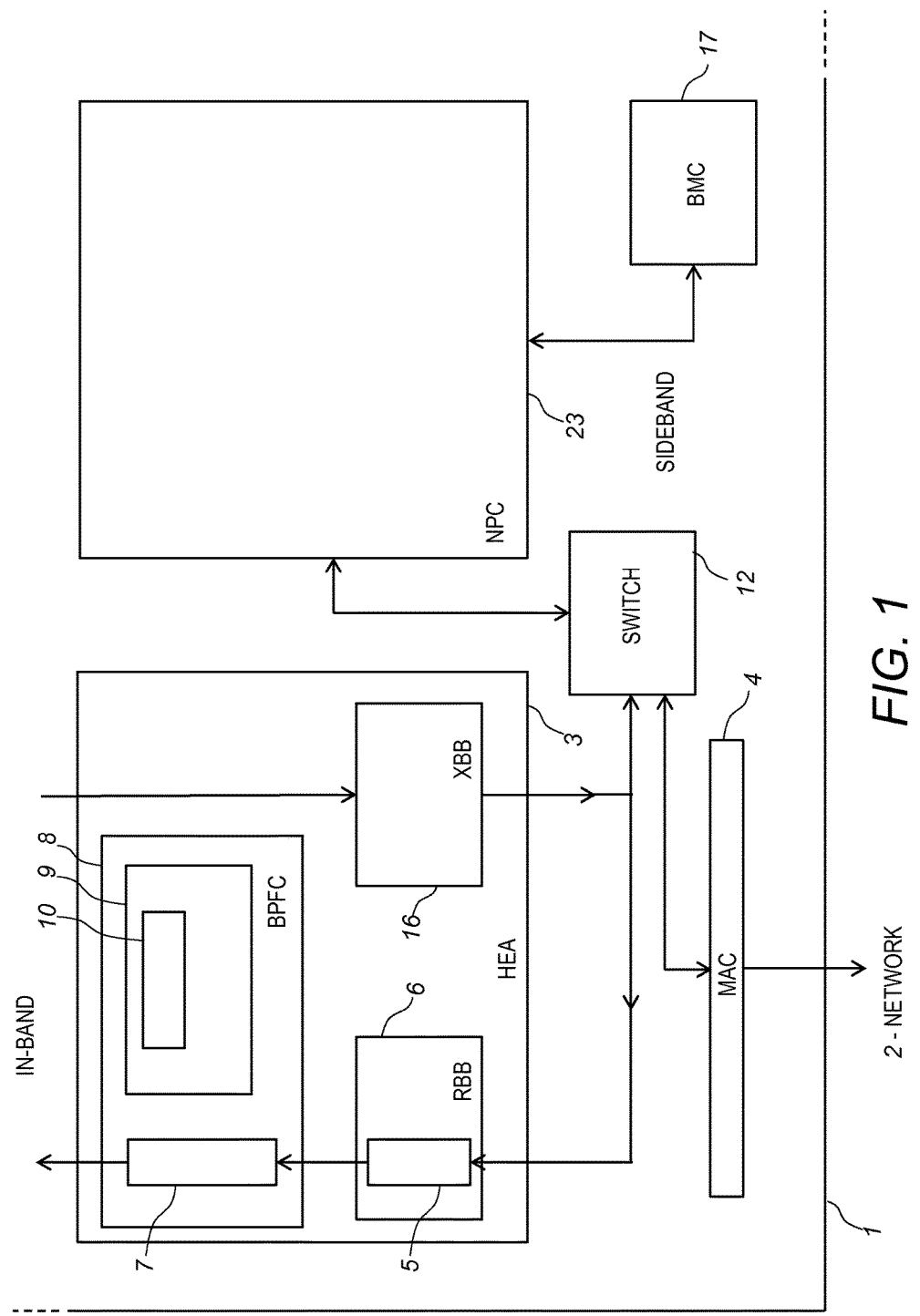
FIG. 1 illustrates a diagram of a device showing an example main network controller-sideband interface (NC-SI) connection.

In accordance with a first aspect of the present disclosure, a network interface controller (NC) can provide a connection for a device to a network. The NC circuit can comprise a sideband port controller. The sideband port controller can provide a sideband connection between the network and a sideband endpoint circuit. The sideband endpoint circuit can communicate information with the network via the sideband. The sideband port controller can include a transmit data route having an input for receiving data packets of data (packets) from the sideband endpoint circuit and an output for passing packets received from the sideband endpoint to the network, and a packet parser connected to the transmit data route to read data from packets received from the sideband endpoint and to analyze their data.

The transmit data route may comprise a buffer that is connected to receive packets from the sideband endpoint circuit and that can forward packets received from the sideband endpoint circuit to the network. The buffer may have a sliding window circuit that can provide a section of the data in the buffer to the packet parser. The sliding window circuit may also be connected to provide the section of the data in the buffer to the output of the transmit data route. The buffer may have a sliding window circuit connect to provide a section of the data in the buffer to the output of the transmit data route. The packet parser may be operative to analyze packets in the transmit data route received from the sideband endpoint and to provide an indication of whether a packet is to be passed to the network, and the transmit data route is responsive to that indication to pass the packet via its output, if it so indicates.

The packet analyzer may be arranged to scan through the packet for an end of packet marker once it has been indicated that the packet is to be passed to the network. The packet parser may be operative to analyze packets in the transmit data route received from the sideband endpoint circuit and to provide an indication of whether a packet contains a command for the sideband port controller, and the sideband port controller can be responsive to that indication to carry out the command, if it so indicates. The packet analyzer may be arranged to analyze the packet further once it has been indicated that it is a command for the sideband port controller.

The sideband port controller may have an action machine responsive to the packet analyzer that can compile a response to the command, and to forward the response to the sideband endpoint. The sideband port controller may comprise a receive data route having an input for receiving packets from the network and an output for passing packets received from the network to the sideband endpoint circuit, as well as a receive arbiter connected to choose between forwarding packets received by the sideband port controller from the network and a response to the command, to the sideband endpoint. The sideband port controller may comprise an event notification unit operative to compile indications into an event notification packet and to pass that to the transmit data route, and the packet parser may be operative to analyze packets in the transmit data route to provide an indication of whether a packet contains an event notification packet, and the sideband port controller is responsive to that indication to forward the information in the event notification packet to the sideband endpoint.

The transmit data route may have a pause mechanism, which prevents packets from advancing along the route if blocked by a condition ahead of them. The sideband port controller may comprise a media access controller (MAC) for communicating with the sideband endpoint. The NC may comprise a main MAC for connection to the network and an injector unit connected to insert packets from the output of the transmit data route of the sideband port controller into a stream of packets being transmitted to the network by the main MAC.

The first aspect of the present disclosure can also provide a method of transmitting data in a NC that can provide a connection for a device to a network. The NC circuit comprising a sideband port controller, the sideband port controller can provide a sideband connection between the network and a sideband endpoint circuit that can communicate information with the network via the sideband. The method can include transmitting packets along a data route from an input for receiving packets from the sideband endpoint circuit to an output of the sideband port controller for passing packets received from the sideband endpoint to the network, and includes analyzing packets transmitted along the data route with a parser connected to the transmit data route.

The method may further include receiving packets from the sideband endpoint circuit in a buffer and forwarding packets received from the sideband endpoint circuit from the buffer to the network. The packet parser may analyze data in a sliding window of the buffer. Data may be transmitted from the sliding window to the output of the transmit data route. Data may be transmitted from a sliding window of the buffer to the output of the transmit data route. The packet parser may analyze packets in the transmit data route received from the sideband endpoint to provide an indication of whether a packet is to be passed to the network, and the method may comprise passing the packet via the output of the transmit data route, if so indicated.

The packet analyzer may scan through the packet for an end of packet marker once it has been indicated that the packet is to be passed to the network. The packet parser may analyze packets in the transmit data route received from the sideband endpoint circuit to provide an indication of whether a packet contains a command for the sideband port controller, and the method may comprise the sideband port controller carrying out the command, if so indicated. The packet analyzer may analyze the packet further once it has been indicated that it is a command for the sideband port controller.

An action machine of the sideband port controller may compile a response to the command, and may forward the response to the sideband endpoint. The method may comprise transmitting packets along a receive data route from an input for receiving packets from the network and an output for passing packets received from the network to the sideband endpoint circuit, and choosing between forwarding, to the sideband endpoint, packets received from the network and a response to the command.

The method may comprise compiling indications into an event notification packet and passing that to the transmit data route. The packet parser can analyze packets in the transmit data route in order to provide an indication of whether a packet contains an event notification packet, and, if so indicated, can forward the information in the event notification packet to the sideband endpoint. The method may comprise preventing packets from advancing along the transmit data route if blocked by a condition ahead of them. The sideband port controller may communicate with the sideband endpoint with a MAC. The method may comprise connecting with the network via a main MAC and inserting packets from the output of the transmit data route into a stream of packets being transmitted to the network by the main MAC.

In accordance with a second aspect of the present disclosure a network interface controller can provide a connection for a device to a network. The network interface controller circuit can include a sideband port controller. The sideband port controller can provide a sideband connection between the network and a sideband endpoint circuit that can communicate information with the network via the sideband. The sideband port controller can include a receive data route that can include an input for receiving packets from the network and an output to pass packets received from the network to the sideband endpoint circuit. The receive data route can include a buffer connected to receive packets from the network and to pass packets received from the network to the sideband endpoint.

The sideband port controller may comprise a receive arbiter and one or more other data sources of the sideband port controller. The receive arbiter can be operative to determine whether a packet from the buffer or data from one of the other circuits of the sideband port controller is to be forwarded via the output of the sideband port controller to the sideband endpoint. The one or more other data sources may comprise a packet parser of the sideband port controller. The packet parser may be connected to read data from packets received from the sideband endpoint to analyze their data. The sideband port controller may comprise an event notification unit operative to compile indications into an event notification packet and to pass that to the packet parser where it is analyzed by the packet parser, and the sideband port controller may be operative to insert the event notification packet into the receive data path for passing to the sideband endpoint. The receive data route may be operative to give priority to event notification packets over packets from the network. The packet parser may be operative to identify packets from the sideband endpoint containing a command from the sideband port controller and the sideband port controller may be operative to compile a response packet to the command. The sideband port controller may be operative to insert the response packet into the receive data path for passing to the sideband endpoint.

The receive data route may be operative to give priority to response packets over packets from the network. The receive data path may be operative to drop packets from the network in the case of overflow. The sideband port controller may comprise a MAC for communicating with the sideband endpoint. The network interface controller may comprise a main MAC for connection to the network and an extractor connected to extract packets from a stream of packets from the network received by the main MAC, and to forward ones recognized as sideband traffic to the receive data route of the sideband port controller.

The second aspect of the present disclosure can also provide a method of receiving data in a network interface controller that can provide a connection for a device to a network. The network interface controller circuit can include a sideband port controller. The sideband port controller can provide a sideband connection between the network and a sideband endpoint circuit that can communicate information with the network via the sideband. The method can include receiving packets along a data route from an input to the sideband controller for receiving packets from the network to an output for passing packets received from the network to the sideband endpoint circuit, and providing in the receive data route, a buffer connected to receive packets from the network and to pass packets received from the network to the sideband endpoint.

The method may include determining whether a packet from the buffer or data from one or more other data sources of the sideband port controller is to be forwarded via the output to the sideband endpoint. The one or more other data sources may comprise a packet parser of the sideband port controller. The method can include analyzing with the packet parser packets received from the sideband endpoint. The method may include compiling indications into an event notification packet and passing that to the packet parser where it is analyzed by the packet parser, and inserting the event notification packet into the receive data path and passing it to the sideband endpoint. The method may include giving priority to event notification packets over packets from the network in the passing of packets to the sideband endpoint. The method may include the packet parser identifying packets from the sideband endpoint containing a command from the sideband port controller compiling a response packet to the command, and inserting the response packet into the receive data path for passing to the sideband endpoint.

The method may comprise giving priority to response packets over packets from the network in the passing of packets to the sideband endpoint. The method may comprise dropping from the receive data path packets from the network in the case of overflow. The sideband port controller may communicate with the sideband endpoint with a MAC. The method may comprise connecting with the network via a main MAC and forwarding packets from the network received by the main MAC recognized as sideband traffic to the input of the receive data route.

In accordance with a third aspect of the present disclosure a network interface controller can include a media access controller; a host adapter that can include a transmit route connected to receive in-band packets from a host and to transmit in-band packets from the host to the media access controller; and, a sideband port controller connected to receive sideband packets from a sideband endpoint and to transmit sideband packets from the sideband endpoint for the network to the host adapter. The host adapter can include a host buffer to store a packet from the host; a sideband buffer to store a packet from the sideband port controller; an arbiter connected to allow; and, a packet in the host buffer and a packet in the sideband buffer in order to advance from there along the transmit route to the media access controller. The arbiter may be connected to give in-band packets higher priority than sideband packets. The arbiter may include a counter connected to increment when an in-band packet is advanced and to reset when a sideband packet is advanced and the arbiter may be arranged to allow a sideband packet to advance when the counter has reached a certain value.

The third aspect of the present disclosure can also provide a method of transmitting data in network interface controller. The method can include receiving in-band packets from a host and storing those in a host buffer, receiving sideband packets from a sideband port controller, and storing those in a sideband buffer. The method can include determining, with an arbiter, which of a packet in the host buffer and a packet in the sideband buffer, to transmit to a media access controller, and can transmit, at different times, a packet in the host buffer and a packet in the sideband buffer to a media access controller and from there to a network. The arbiter may give in-band packets higher priority than sideband packets. The determining may comprise counting when an in-band packet is transmitted to the media access controller, the count being reset when a sideband packet is transmitted, and transmitting a sideband packet to the media access controller when the counter has reached a certain value.

In accordance with a fourth aspect of the present disclosure a network interface controller can include a media access controller connected to receive in-band and sideband packets, a host adapter comprising a receive route connected to receive packets from the media access controller to transmit in-band packets of those to the host, and a sideband port controller comprising a sideband receive buffer. The host adapter can include a first receive buffer to store a packet from the media access controller, an arbiter connected to allow, and an in-band packet in first receive buffer to advance from there along the receive route towards the host and a sideband packet to advance to the sideband receive buffer of the sideband port controller.

The host adapter may comprise a second receive buffer on the receive route connected to receive in-band packets from the first receive buffer. The sideband port controller may be connected to transmit sideband packets to a sideband endpoint. The arbiter may comprise a decoder connected to read the header of a packet in the first receive buffer and may be responsive to that to route the packet towards the host or the sideband controller accordingly.

The fourth aspect of the invention can also provide a method of receiving data in a network interface controller. The method can include receiving in-band and sideband packets from a network, with a media access controller, into a first receive buffer. The method can include determining, with an arbiter, whether to transmit a packet in the first receive buffer to a host or to a sideband receive buffer. The method can include transmitting the packet to the host or to the sideband receive buffer accordingly. The method may include receiving in-band packets transmitted from the first receive buffer in a second receive buffer. The method may include transmitting packets in the sideband receive buffer to a sideband endpoint. The arbiter may read the header of a packet in the first receive buffer and responds to that to route the packet towards the host or to the sideband receive buffer accordingly.

In accordance with a fifth aspect of the present disclosure, a network interface controller can provide a connection for a device to a network, the network interface controller comprising a sideband port controller. The sideband port controller can provide a sideband connection between the network and a sideband endpoint circuit that can communicate information with the network via the sideband. The sideband port controller can include a packet parser, and an event notification unit operative to compile indications into an event notification packet. The packet parser can be operative to analyze packets in order to provide an indication of whether a packet contains an event notification packet, and the sideband port controller can be responsive to that indication in order to forward the information in the event notification packet to the sideband endpoint.

The sideband port controller can include a transmit data route having an input for receiving packets from the sideband endpoint circuit and an output for passing packets received from the sideband endpoint circuit to the network. The event notification unit is connected to pass the event notification packet to the transmit data route and the packet parser is connected to the transmit data route to analyze packets containing the event notifications and packets received from the sideband endpoint. The sideband port controller may comprise a transmit arbiter connected to choose between forwarding along the transmit data route packets received by the sideband port controller from the sideband endpoint and packets containing the event notifications received from the event notification unit, The packet parser may be connected to analyze packets forwarded by the transmit arbiter. The event notification unit may comprise a memory mapped register. The memory mapped register may be connected to provide at least part of its content as at least part of the event notification packet complied by the event notification unit. The event notification unit may be connected to enable the memory mapped register in response to the writing of the memory mapped register. The event notification unit may be connected to provide the event notification packet with a control bit identifying it as such. The packet parser may be connected to distinguish packets containing event notifications from packets received from the sideband endpoint circuit on the basis of the control bit. The sideband port controller may be responsive to the packet parser identifying a packet containing an event notification to assemble and forward an event notification packet to the sideband endpoint circuit.

The transmit data route may comprise a buffer connected to receive packets from the sideband endpoint and to forward packets received from the sideband endpoint circuit to the network. The buffer may have a sliding window circuit connect to provide a section of the data in the buffer to the packet parser. The sliding window circuit may also be connected to provide the section of the data in the buffer to the output of the transmit data route. The buffer may have a sliding window circuit connect to provide a section of the data in the buffer to the output of the transmit data route. The packet parser may be operative to analyze packets in the transmit data route received from the sideband endpoint and to provide an indication of whether a packet is to be passed to the network, and the transmit data route may be responsive to that indication to pass the packet via its output, if it so indicates. The packet analyzer may be arranged to scan through the packet for an end of packet marker once it has been indicated that the packet is to be passed to the network.

The packet parser may be operative to analyze packets in the transmit data route received from the sideband endpoint and to provide an indication of whether a packet contains a command for the sideband port controller, and the sideband port controller may be responsive to that indication to carry out the command, if it so indicates. The packet analyzer may be arranged to analyze the packet further once it has been indicated that it is a command for the sideband port controller. The sideband port controller may have an action machine responsive to the packet analyzer to compile a response to the command, and to forward the response to the sideband endpoint. The sideband port controller may comprise a receive data route having an input for receiving packets from the network and an output for passing packets received from the network to the sideband endpoint circuit, and a receive arbiter connected to choose between forwarding packets received by the sideband port controller from the network and a response to the command, to the sideband endpoint circuit.

The transmit data route may have a pause mechanism, which prevents packets from advancing along the route if blocked by a condition ahead of them. The sideband port controller may comprise a MAC for communicating with the sideband endpoint. The network interface controller may comprise a main MAC for connection to the network and an injector unit connected to insert packets from the output of the transmit data route of the sideband port controller into a steam of packets being transmitted to the network by the main MAC.

The fifth aspect of the present disclosure can also include a method of providing event notifications in a network interface controller providing a connection for a device to a network, the network interface controller comprising a sideband port controller, the sideband port controller providing a sideband connection between the network and a sideband endpoint circuit that communicates information with the network via the sideband. The method can include compiling indications into an event notification packet, and a packet parser analyzing packets to provide an indication of whether a packet can contain an event notification packet, and if this is so, the sideband port controller forwarding the information in the event notification packet to the sideband endpoint.

The method can include transmitting packets along a data route from an input for receiving packets from the sideband endpoint circuit to an output of the sideband port controller for passing packets received from the sideband endpoint circuit to the network. The event notification unit can pass the event notification packet to the transmit data route and the packet parser analyses packets containing the event notifications and packets received from the sideband endpoint. The method may include choosing between forwarding packets received by the sideband port controller from the sideband endpoint and packets containing the event notifications received, and forwarding the chosen packets. The packet parser may analyze packets forwarded. The compiling may be responsive to a memory mapped register. The compiling may include including at least part of the content of the memory mapped register as at least part of the event notification packet. The compiling may be done in response to writing of the memory mapped register. The event notification packet may have a control bit identifying it as such.

The packet parser may distinguish packets that contain event notifications from packets received from the sideband endpoint circuit on the basis of the control bit. The sideband port controller may respond to the packet parser identifying a packet containing an event notification to assemble and forward an event notification packet to the sideband endpoint circuit.

The method may include receiving packets from the sideband endpoint in a buffer and forwarding packets received from the sideband endpoint circuit from the buffer to the network. The packet parser may analyze data in a sliding window of the buffer. Data can be transmitted form the sliding window to the output of the transmit data route. Data may be transmitted from a sliding window of the buffer to the output of the transmit data route. The packet parser may analyze packets in the transmit data route received from the sideband endpoint to provide an indication of whether a packet is to be passed to the network, and the method may comprise passing the packet via its output, if so indicated. The packet analyzer may scan through the packet for an end of packet marker once it has been indicated that the packet is to be passed to the network. The packet parser may analyze packets in the transmit data route received from the sideband endpoint to provide an indication of whether a packet contains a command for the sideband port controller, and the method may comprise the sideband port controller carrying out the command, if so indicated. The packet analyzer may analyze the packet further once it has been indicated that it is a command for the sideband port controller. An action machine of the sideband port controller may compile a response to the command, and forward the response to the sideband endpoint.

The method can include transmitting packets along a receive data route from an input for receiving packets from the network to an output for passing packets received from the network to the sideband endpoint circuit, and choosing between forwarding, to the sideband endpoint circuit, packets received from the network and a response to the command. The method can include preventing packets from advancing along the transmit data route if blocked by a condition ahead of them. The sideband port controller may communicate with the sideband endpoint with a MAC. The method may comprise connecting with the network via a main MAC and inserting packets from the output of the transmit data route into a stream of packets being transmitted to the network by the main MAC.

A Network Controller-Sideband Interface (NC-SI) port controller (NPC) is a circuit that can provide a connection between a baseboard management controller (BMC) and a network interface controller (NC) for local and remote management traffic. It can allow two types of traffic to be carried between the BMC and the NC: "Control" traffic and "Pass-through" traffic. Control traffic consists of commands (requests) sent to the local NC for controlling and configuring it, responses sent by the NC back to the BMC, as well as Asynchronous Event Notifications ("AENs") in which the NC can send data back to the BMC without being prompted from the BMC. Pass-through traffic consists of packets that are transferred between an external network and the local BMC using the NC-SI. An NPC is not limited to communicating the sideband data with a BMC, but that is the usual endpoint for it.

FIG. 1 shows an example of a device 1 that can communicate with a network 2. The network 2 can handle the reception of packets into the device. The device 1 can include a host Ethernet adapter (HEA) 3. The device 1 can include an associated media access controller (MAC) 4. The MAC 4 can receive data from the network 2 via its communication line and can transmit the data to a line buffer 5 (via a switch 12). This buffer forms part of a receive backbone (RBB) 6. The RBB manages the movement of data from the MAC by converting, aligning, and storing the data into the line buffer 5. Once the RBB 6 stores the data, the RBB 6 transmits the data to a second buffer 7. The second buffer 7 forms part of a (BaRT-based finite state machine (BFSM))-based parser filter and checksum (BPFC) 8. The second buffer 7 is known in this case as the "data path".

The role of BPFC 8 is to analyze the packets in the second buffer 7 and make various decisions, for example, checking a checksum of a data packet that can be transmitted with the data packet. A various decision can also be to decide a packet queues to send the data packet to (the packet queues are not shown), i.e. those for distributing packets to other ports of the switch, classifying or discarding the packets, before they are forwarded to the main part of the device, i.e. the host. This can be accomplished with a packet parser 9 like that known from US2012/0159132 and US2012/0195208. The packet parser 9 can include a rule processor 10 that can receive data from the data path buffer 7 and can then apply parsing rules to the received data. The parsing rules can include a test part and a result part. The test part can specify, among other things, values to compare with the received data and masks that can be applied to match a current rule. The result part can encode, among other things, a set of instructions and actions to be performed when the current rule is matched. This combination of comparisons and actions can be used to make the various decisions noted above. The rules can be loaded from a local store (and several are loaded into the rule processor 10 to be processed in parallel).

Transmit backbone unit (XBB) unit 16 can receive the packets from a host and can prepare them for transmission by the MAC 4 (via the switch 12). The MAC 4 can also pass traffic between the network 2 and a BMC 17. This traffic is known as pass-through traffic because it does not carry a local NC command or NC response. Pass-through packets from the BMC 17 to be transmitted over the network 2 can be received by an NPC unit 23 and can be passed from the NPC unit 23 to MAC 4 (via the switch 12), and packets received by the MAC 4 destined for the BMC can be handled by the NPC unit before being passed to the BMC. In FIG. 1 (and FIG. 2 discussed below) the NC can include the HEA 3, MAC 4, switch 12, and NC-SI port controller (NPC) 23, but may not include the BMC 17. The switch 12 is provided to route the packets between the MAC 4, the HEA 3 and the NPC 23.

Figure 2:
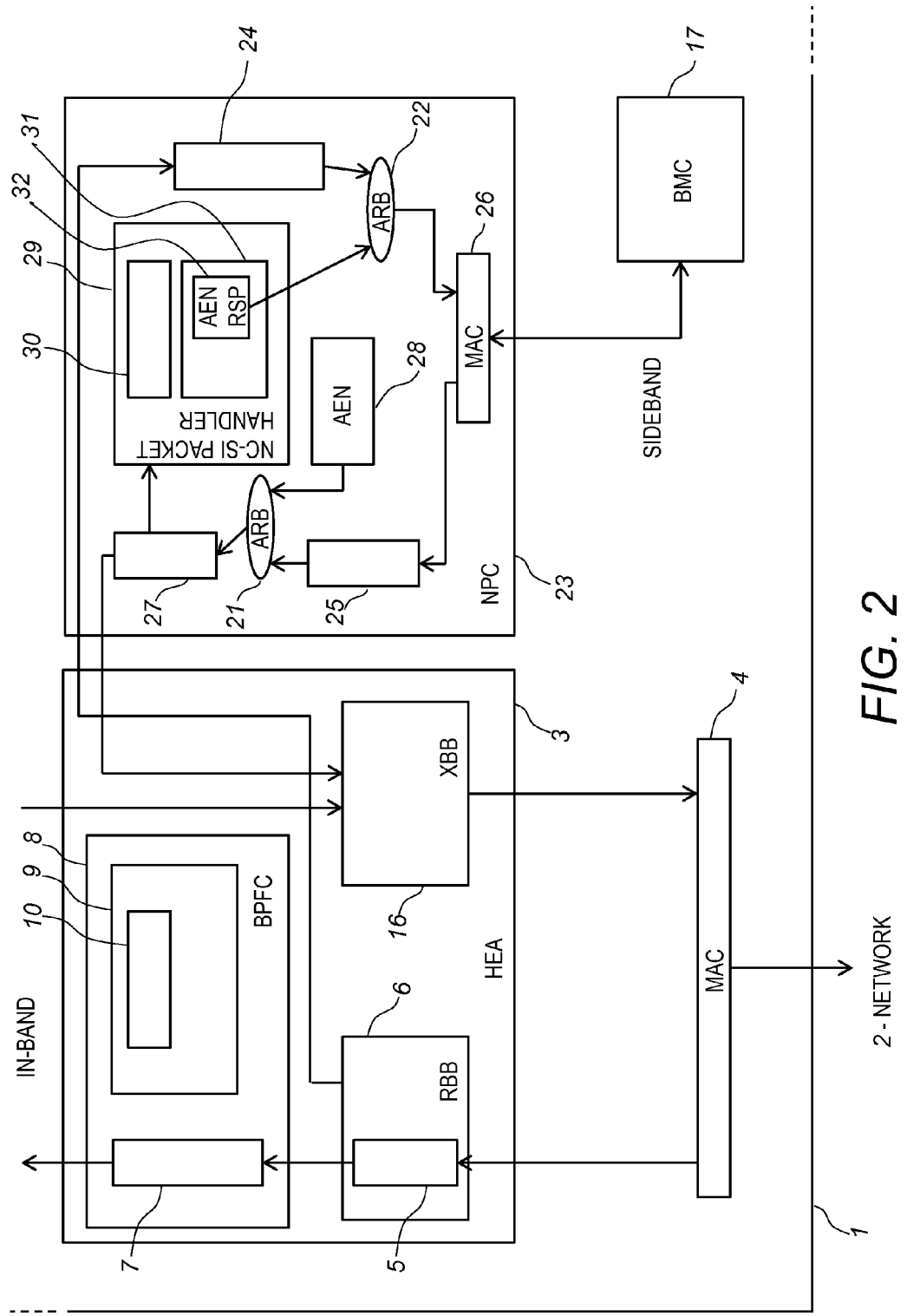
FIG. 2 illustrates a diagram of NC-SI connections, according to embodiments of the present disclosure.

FIG. 2 shows an embodiment of a device 1. This embodiment, in block diagram form, shows the internal circuit of the NC-SI port controller (NPC) 23 described in FIG. 1. NPC 23 can include a MAC 26, a first transmit buffer 25, an Asynchronous Event Notification Unit (AEN unit) 28, an NC-SI packet handler 29, a receive buffer 24, a transmit arbiter 21, and a receive arbiter 22. The MAC 26 is connected to receive packets from the BMC 17 and can operate to pass the received packets into the first transmit buffer 25. The packets can be passed from there, via the transmit arbiter 21 to a second transmit buffer 27. When the packets are at the second buffer 27, the NC-SI packet handler 29 can examine them and can determine whether they should be forwarded to the XBB unit 16 (from where they can be forwarded to network 2 via MAC 4), or whether they should remain within the NPC 23 for further processing. The data sent to the NPC 23 by the BMC 17 can include commands for the NC such as, for example, enable/disable a channel or get parameters, as well as pass-through packets to be forwarded by the NIC on to the external network 2. The NC-SI packet controller 23 can provide a transmit data route between an input at NPC MAC 26 and the output of the second transmit FIFO 27, which route can include NPC MAC 26, first transmit buffer 25 transmit arbiter 21, and second transmit buffer 27. Buffers that are include in the embodiments of the present disclosure can include a first in, first out (FIFO) method. The FIFO method can organize and manipulate a data buffer, where an oldest (first) entry, or 'head' of the queue, is processed first. A Wr request 286 is depicted.

Ethernet packets received into the NC-SI port controller 23 from the network via RBB unit 6 can be passed directly to the receive buffer 24. The receive arbiter 22 can choose between the NC-SI packet handler 29 and the receive buffer 24 for which packet to transmit next to the BMC 17. This can be accomplished by connecting the receive buffer 24 or the NC-SI packet handler 29 to the NPC MAC 26, which in turn can transmit it to the BMC. The NPC 23 can provide a receive data route between an input to receive buffer 24 and an output at NPC MAC 26, which route also can include those and the transmit arbiter 22. The receive buffer 24, can include an overrun mechanism that can drop incoming packets when it is full.

In some embodiments, the receive arbiter 22 can connect the NC-SI packet handler 29 to the MAC 26, thereby transmitting data from the NC-SI packet handler to the BMC. This data may be responsive to commands from the BMC, but may also be Asynchronous Event Notifications (AENs). In some other embodiments, the NPC can be in connection to a NC, the NC can include more than one external network connection. One of such connections is then referred to as a "channel", and one receive buffer (such as 24) can be provided per channel into the NPC. Asynchronous Event Notification packets (AENs) can enable the NC to deliver unsolicited notifications to the BMC when certain status changes occur in the NC. Each event consists of a specific AEN packet that the NPC can generate and then send to the BMC, the AEN packet discussed further in FIG. 7.

In embodiments, an AEN packet can include a certain structure. FIG. 7 depicts the packet format of a NC-SI AEN packet. The AEN packet comprises a plurality of ordered fields, where each field can have characteristics, such as size, length, position in a packet, content, possible values, etc. in accordance with an NC-SI specification. The different fields can be indicated using labels that indicate their function and/or content. A summary of the labelled fields and their associated function and/or content is as follows:

"DA" represents the Destination Address field of the Ethernet header that can encapsulate NC-SI packets. This field may not interpreted by the BMC and is always set to a broadcast address in a form of FF:FF:FF:FF:FF:FF.

"SA" represents the Source Address field of the Ethernet header which encapsulates all NC-SI-packets. The NC always sets this field to FF:FF:FF:FF:FF:FF for the NC-SI packets that it can generate.

"EtherType" represents the EtherType field of the Ethernet header which encapsulates all NC-SI packets. This field can be set to the value of 0x88F8.

"MCID" identifies the BMC which has issued the command. This field is fixed to the value of 0x00 in version 1.0.0 of the NC-SI specification.

"HR" identifies the version of the control packet header used by the sender. The value of 0x01 corresponds to version 1.0.0 of the NC-SI specification.

"IID" is a sequence number copied from the sequence identifier field used by the corresponding command sent by the BMC. This field is fixed to 0x00 because by definition, an AEN packet is never issued as a response to a previous BMC command and therefore an AEN packet does not need to be acknowledged with an IID sequence number.

"CPT" is a Control Packet Type field that identifies the current packet among 127 possible type of commands and 127 possible type of responses. Because an AEN packet is neither a command nor a response, this field is fixed to 0xFF.

"ChID" identifies the package ID and the internal channel ID of the NC which is issuing this AEN.

PLLen contains the length of the payload data present in the current AEN packet, excluding Payload Pad and optional Checksum value.

"AEN-TYPE" can identify the type of AEN packet. Currently, only three AEN types are defined by the NC-SI specification version 1.0.0. These are the Link Status Change type (encoded with AEN-TYPE=0x0), the Configuration Required type (encoded with AEN-TYPE=0x1) and the Host NC Driver Status Change type (encoded with AEN-TYPE=0x2). AEN-TYPE values 0x3 . . . 0x7F are reserved and AEN-TYPE values 0x80 . . . 0xFF are for OEM-specific use.

"Payload Data" contains AEN packet-specific data.

"Payload Pad" are 0 to 3 Bytes used to align the Checksum field to a 32-bit boundary and make the overall Payload (Data+Pad) multiple of 4 Bytes. These padding bytes are always equal to 0x00.

"Checksum" is the 32-bit checksum compensation value computed as the 2's complement of the checksum over the 16-bit unsigned integer values that make up the AEN packet. The content of this field is optional and a value of all zeros can be set to specify that the checksum is not being provided for the current response.

"FCS" represents the Frame Check Sequence field of the Ethernet header which encapsulates all NC-SI packets.

As mentioned above, it is one of the tasks of the NPC 23 to generate and send such formatted AEN packets to the BMC. This it does when the NC-SI packet handler 29 is exposed to asynchronous events from the NC.

The NC-SI packet handler 29 is exposed to asynchronous events when an AEN pseudo-packet ends up into the transmit buffer 27 and its content is parsed.

Figure 3:
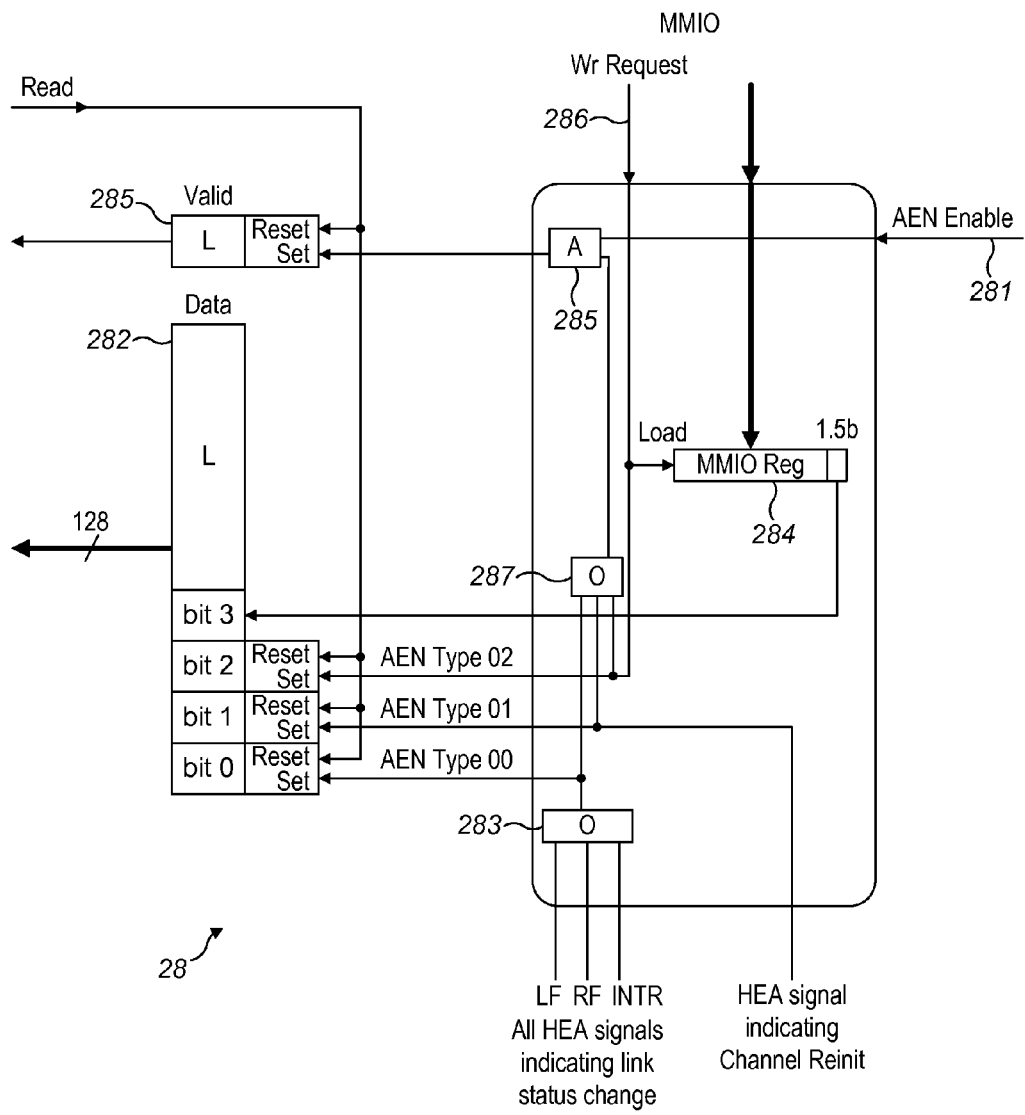
FIG. 3 illustrates a diagram of an asynchronous event notifications (AEN) unit, according to embodiments of the present disclosure.

AEN pseudo-packets are compiled by the AEN unit 28. The details of this unit are shown in FIG. 3, according to various embodiments. When enabled by an enable signal 281, this compiles an AEN pseudo-packet of up to 16 bytes (=128 bits) in a latch 282. In embodiments, the AEN pseudo-packet can contain four 1-bit flags so as to implement three AEN packet types that can be defined by the NC-SI specification version 1.0.0 (the rest of the bits can be unused). A larger AEN pseudo-packet can allow for it to be used by other circuits that have much more complex states to report than as NIC can have. Bit 0 of the AEN pseudo-packet is connected to be set if any of three signals from the HEA 3 that indicate that the status of the "external interface link", i.e. the connection to the network provided by the conductors or fiber optic connected to the MAC 4, has changed, which signals are grouped together by an OR gate 283. In embodiments, bit 1 of the AEN pseudo-packet is set if the network controller has transitioned to an error or a reset state which requires the interface to be re-initialized by the BMC. Bit 2 of the AEN pseudo-packet is set if there is a change in the state of the host driver of the NC. Bit 3 of AEN pseudo-packet corresponds to the payload field of an AEN packet of AEN-TYPE=2. This bit indicates whether NC driver for the host external network interface is operational ('1') or not ('0'), and is provided by a memory mapped IO (MMIO) register 284 which is accessible by the host. Finally the AEN unit 28 provides a valid signal being the logical AND, provided by AND gate 285, of the enable signal 281 and the logical OR, provided by OR gate 287, of the three AEN status signals from the HEA. So this signal indicates that there is some AEN status to report.

Figure 4:
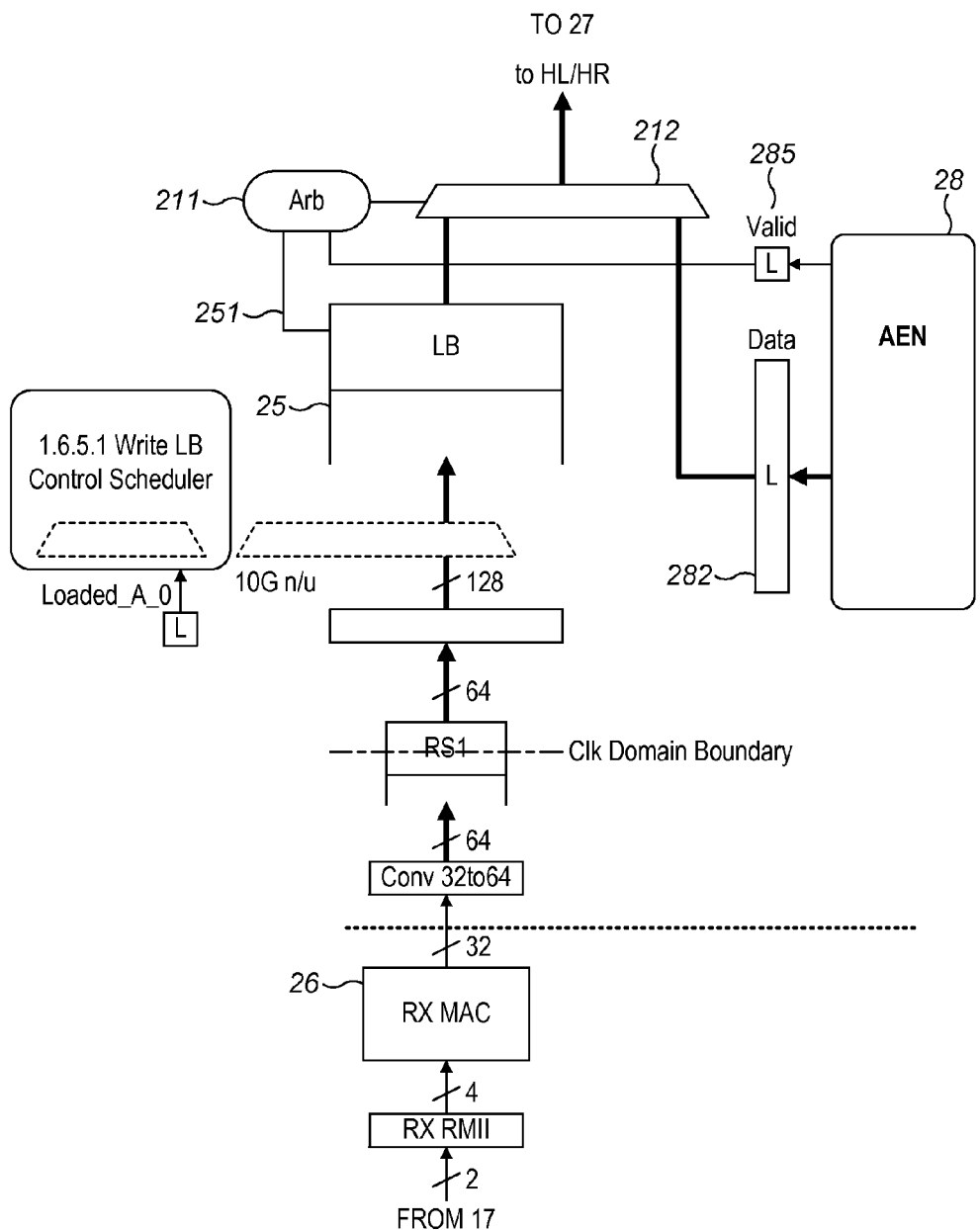
FIG. 4 illustrates a diagram of a circuit around a transmit arbiter, according to embodiments of the present disclosure.

FIG. 4 shows a first part of how the AEN pseudo-packet can be delivered to NC-SI packet handler 29 shown in FIG. 2, according to various embodiments. This can show the route of the AEN pseudo-packet from the AEN unit 28 to the second transmit buffer 27. This can include the latch 282, a multiplexer 212 of the transmit arbiter 21, and the marked connection to the second transmit buffer 27. Arbitration logic 211 of transmit arbiter 21 receives the valid signal from AEN unit 28 and a signal 251 from the first transmit buffer 25 indicating its status and decides which should pass its packet to the second transmit buffer 27. It can then accordingly set multiplexer 212 of the transmit arbiter 21 to connect the second transmit buffer 27 to the first transmit buffer 25 or pseudo-packet latch 282. The data in the connected one of those is then passed to the second transmit buffer 27. The transmit arbiter 21 gives priority to the pseudo-packet latch 282 because its transmission is somehow equivalent to the generation of a software interrupt in the context of a general purpose processor.

FIG. 2 shows the second part of how the AEN pseudo-packet is delivered to the BMC 17. The NC-SI packet handler 29 can read data from the AEN pseudo-packet in the second transmit buffer using a sliding window, i.e. a parallel set of connections to a portion of the data, the portion being determined by a pointer. The NC-SI packet handler 29 has a packet parser 30. This has similar structure and operation to that of the BPFC unit 8 in that it has rules coded in wide instruction words which can specify, among other things, values for comparing with the data words and masks to be applied in the comparison, which comparisons are used to identify conditions and make decisions, providing output accordingly. The rules in this case are rules for carrying out the functions of the NC-SI packet handler 29. AEN pseudo-packets are tagged with a control bit allowing the packet parser 30 to differentiate them from other NC-SI command packets and pass-through packets. The NC-SI packet handler 29 has a set 31 of action machines 32 which respond to the output of the packet parser 30 by taking various actions. In the case of the packet parser 30 identifying an AEN pseudo-packet, an AEN/RSP action machine 32 prepares one (and possibly multiple) AEN packet formatted according to the structure depicted in FIG. 7. When the AEN packet is ready for forwarding to the BMC 17, it can be presented to receive arbitrator 22, which decides when it should be passed to MAC 26, which can transmit it to the BMC 17.

When the packet parser 30 recognizes an NC-SI command packet in the second transmit buffer 27 it can apply a set of rules to it to decode the command and provides output to the AEN/RSP action machine 32 causing it to generate a NC-SI response packet containing the information sought by the command. Again, the AEN/RSP action machine 32 can format and presents the response packet to receive arbitrator 22, which can decide when it should be passed to MAC 26, which can transmit it to the BMC 17.

The receive arbitrator 22 can give priority to command responses and AEN packets to avoid the BMC becoming starved of those in the case of a long burst of pass-through packets for the BMC is received from the network.

Finally, the packets in the second transmit buffer 27 may be pass-through packets from the BMC bound for the network. These packets are recognized by the parser if they carry an EtherType value that is different from the NC-SI EtherType (i.e. 0x88F8), and if their source MAC address matches the settings of the external network interface. Once identified by the packet parser 30 of the NC-SI packet handler 29, the output of the sliding window can be passed to the XBB unit 16. The packet parser can advance the sliding window along the pass-through packet transmitting the packet data to the XBB unit 16 as it goes, terminating when a rule of the packet parser 30 finds an end of packet (EOP). No other rule processing is done by the packet parser 29, since the NC-SI is not concerned with the content of the packet.

The first and second transmit buffers 25, 27 can be provided with a pause mechanism, which can allow flow control of packets from the BMC 17. So, for example if the route from the BMC 17 to the network 2 becomes blocked by AEN pseudo-packets or packets from the HEA to the XBB unit 16, the BMC pauses sending its packets. This can be discussed further below.

Figure 5:
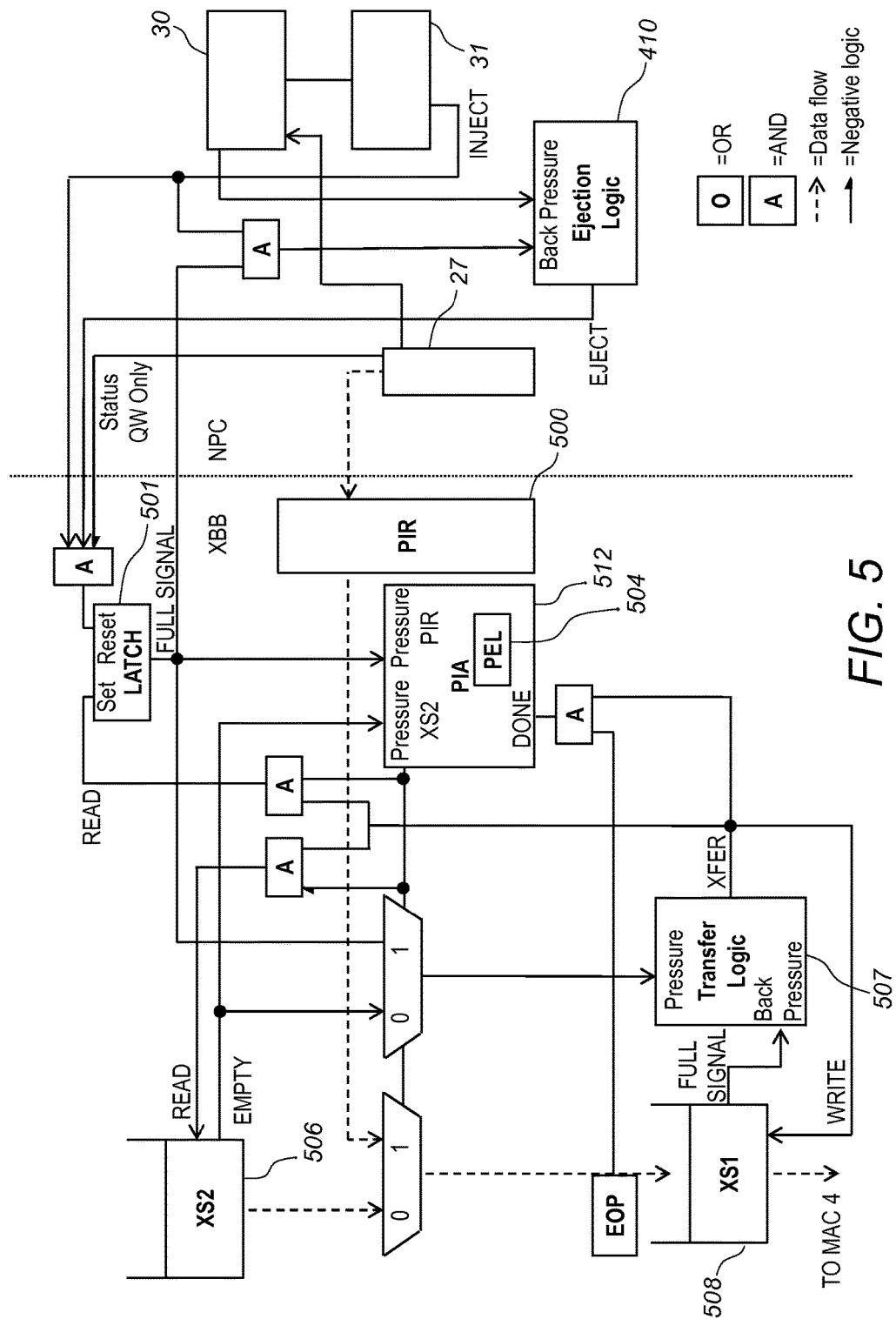
FIG. 5 illustrates a diagram of circuits for injecting pass-through traffic in the host traffic, according to embodiments of the present disclosure.

FIG. 5 is a block diagram of the relevant components in the XBB unit 16 and the NPC 23 for the injection of data packets from the BMC 17 into the XBB unit 16 and hence into the stream of packets transmitted by the main MAC 4, according to various embodiments. Note that in FIG. 5 and FIG. 6 the dashed connections show the path of the data packets.

Firstly, when a data packet has been forwarded to the second buffer 27 of the NPC unit 23, as noted above, the packet parser 30 can read the packet then determine if the packet is an NC-SI command, AEN pseudo-packet or pass-through packet from the BMC 17 that is to be injected into the XBB unit 16.

If the data packet is an NC-SI command then the packet parser 30 examines the packet and signals ejection logic 410 to gate a back-pressure signal that it receives from the XBB unit 16, allowing the packet to be discarded from the second buffer 27 after being processed and without entering the XBB unit 16. The back pressure signal, is a full signal from the XBB unit and indicates that it cannot receive further packets.

If the packet is a pass-through packet then the packet parser 30 does not gate the back pressure. The packet parser having analysed the packet, its outputs cause the action machine 31 to switch on an inject signal for the XBB unit 16.

If a packet injection register (PIR) 500 of the XBB unit 16 is not full (signalled by the back pressure/full signal from a latch 501), then the data packet is transferred from the buffer 27 to the PIR 500. This is apart from the part of the data packet containing the MAC status, which is not used in the XBB unit 16 and is discarded. The end of packet marker (EOP) triggers the latch 501 to be set, which indicates the PIR 500 is full.

Next, a packet injection arbiter (PIA) 512 of the XBB unit selects the next packet to be forwarded to an output XS1 buffer 508 of the XBB unit 16. This arbitration occurs when a packet is not engaged. Priority is given to an XS2 buffer 506, which receives normal data packets from the host into the RBB unit, but a "leak" mechanism is provided by the arbiter 512 so the network is not starved of pass-through traffic from the NPC unit 23. In the "leak" mechanism a counter is provided connected to increment when an in-band packet is advanced from XS1 to XS2 and to be reset when a packet is advanced from the NPC, and the arbiter 512 is arranged to allow a packet from the NPC packet to advance when the counter has reached a certain value. If the XS2 buffer 506 is empty, which indicated to the PIA 512 by that buffer's "empty" signal, then the PIR 500 is selected, and vice versa. Once the decision has been made, a packet engaged latch (PEL) 504 is set.

The data packet then transfers from the selected source (either the XS2 buffer 506 or the PIR 500) to an XS1 buffer 508 of the RBB unit 16. If the XS1 buffer 508 is full then a "full" signal from that buffer is sent to a transfer logic block 507, which gates the back pressure for this transfer (i.e. stops data packets being transferred from either the XS2 buffer 506 or the PIR 500). An end of packet (EOP) signal can be sent to the PIA 512 when the end of packet marker is transferred to the XS1 buffer 508, which resets the packet engaged latch (PEL) 504, and the arbitration decision process in the PIA 512 begins again.

The XS1 buffer 508 then transmits the received data packets to the main MAC 4. Note that injection of sideband packets at this point in the transmission of host data to the network also allows sideband packets to be looped-back to the receive path (i.e. via the RBB unit 3 and BFPC unit 8) to the host. This allows implementation of "OS2 BMC" technology.

Figure 6:
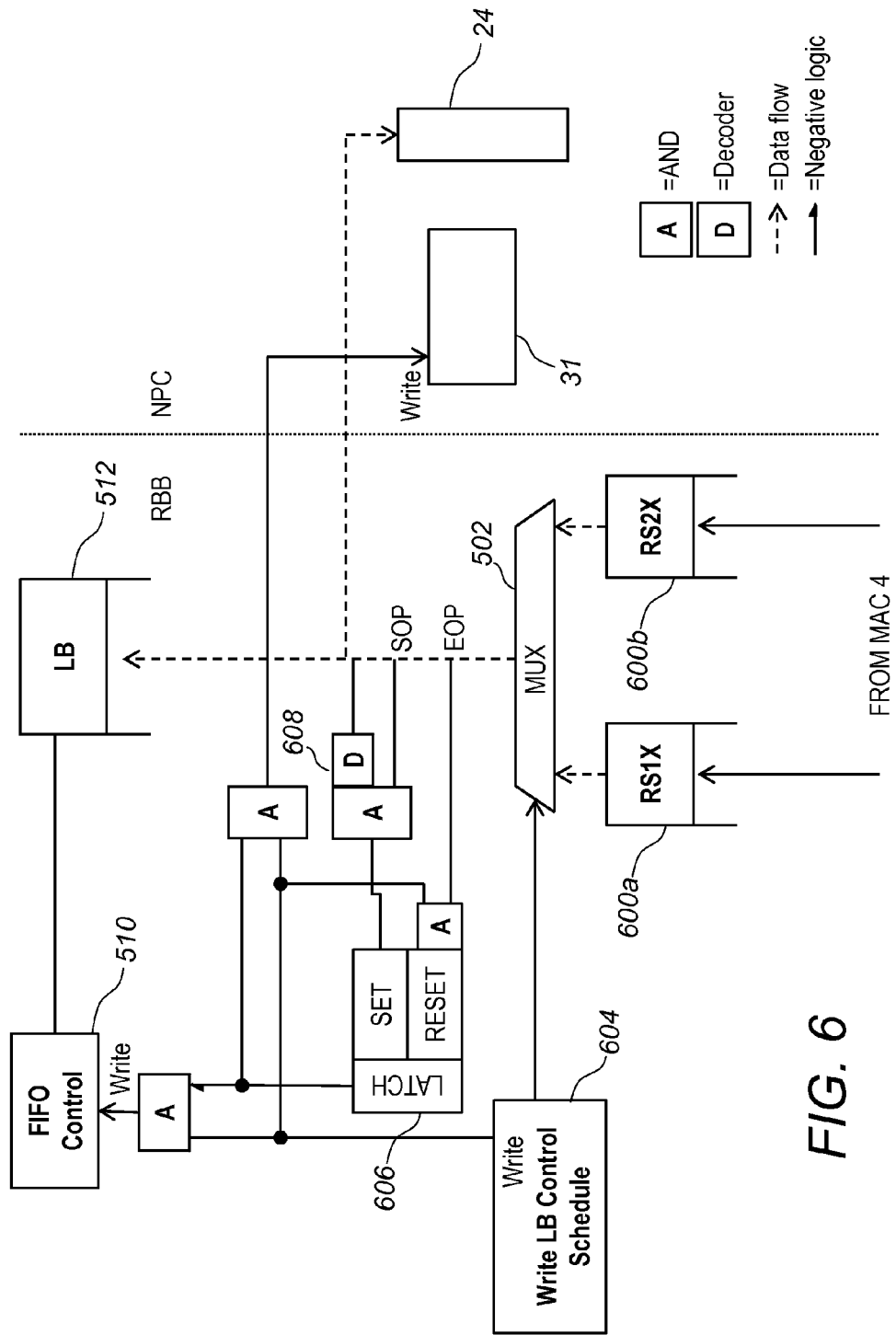
FIG. 6 illustrates a diagram of circuits for extracting pass-through traffic from the host traffic, according to embodiments of the present disclosure.

In FIG. 6, a block diagram of the relevant components in the RBB unit 6 and the NPC unit 23 for extracting data packets from the main traffic incoming to the device from the network that are destined for the BMC 17 can be seen, according to various embodiments. Write 31 and 24 are within the NPC as indicated by a dotted vertical line that is to the left of 31.

Firstly, data can be received by buffer RS1X 600*a* and buffer RS2X 600*b* of the RBB unit from the main MAC 4 then into MUX 502. A scheduler 604 can then decide which of those buffers the next data packet is selected from via an arbitration mechanism.

The selected data packet is read by a decoder 608. The decoder 608 reads the packet header. If the packet header says that the packet is destined for the BMC 17 then the decoder 608 sets a latch 606. If the packet header is not destined for the BMC 17 then the decoder does not set the latch 606.

The write control scheduler 604 then sends a "write" pulse. If the latch 506 is set, then the "write" pulse is sent to the action machines 31 in the NC-SI unit 23 and the packet can be sent to the receive buffer 24 of the NC-SI. If the latch is not set, the "write" pulse can be sent to a FIFO control 510 of the RBB unit and the packet can be sent to a line buffer (LB) 512 of the RBB unit.

Finally, the EOP marker of the packet triggers the latch 606 to reset, making the LB buffer the default recipient of incoming packets. In turn packets in the LB buffer 512 can be passed to the BPFC unit 8.

Whilst the present invention has been described and illustrated with reference to particular embodiments, it will be appreciated by those of ordinary skill in the art that the invention lends itself to many different variations not specifically illustrated herein.

The present invention may be a system or a method.

The block diagrams in the Figures illustrate the architecture, functionality, and operation of possible implementations of systems and methods according to various embodiments of the present invention. In this regard, each block in the block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams can be implemented by special purpose hardware-based systems that perform the specified functions or acts or carry out combinations of special purpose hardware and computer instructions.

What is claimed is:

1. A network interface controller for providing a connection for a device to a network, the network interface controller comprising a sideband port controller, the sideband port controller for providing a sideband connection between the network and a sideband endpoint circuit that is operative to communicate information with the network via a sideband, the sideband port controller comprising:

a receive data route having an input for receiving packets from the network via a receive backbone unit and an output for passing the packets received from the network to the sideband endpoint circuit, the receive data route comprising a receive buffer to receive the packets from the network and to pass the packets received from the network to the sideband endpoint circuit, wherein the receive buffer includes an overrun mechanism configured to drop received packets when the receive buffer has no available bandwidth;

a receive arbiter and one or more other data sources of the sideband port controller, the receive arbiter configured to determine whether the received packets from the receive buffer or data from a data source of the one or more other data sources of the sideband port controller is to be forwarded via the output of the sideband port controller to the sideband endpoint circuit;

a packet injection register (PIR) that is configured to accept sideband packets when the PIR has available bandwidth to store the sideband packets, wherein the sideband packets are packets received from the sideband endpoint circuit;

a latch configured to be set when an end-of-packet (EOP) marker signals that the PIR has no available bandwidth;

a packet injection arbiter (PIA) configured to select the sideband packets to be forwarded to an output XS1 buffer, and to prioritize forwarding the sideband packets to an XS2 buffer over forwarding the sideband packets to the output XS1 buffer, wherein both the output XS1 buffer and the XS2 buffer are connected to the receive data route, wherein the PIA is connected to a leak mechanism that forwards the sideband packets to the network, wherein the output XS1 buffer transmits received sideband packets to a main media access controller (MAC);

a counter configured to increment when an in-band packet is advanced, along the receive data route, from the output XS1 buffer to the XS2 buffer and to reset when any sideband packet is advanced from the network interface controller, wherein the PIA is arranged to allow the sideband packet to advance when the counter has reached a certain value;

a packet engage latch that is set when either the output XS1 buffer or the XS2 buffer is selected to receive either the in-band packet or the sideband packet, wherein the packet engage latch is in the PIA; and a transfer logic block configured to stop data packets from being transferred by the XS2 buffer and the PIR in response to receiving a signal indicating that the XS1 buffer is full.

2. The network interface controller as claimed in claim 1, wherein the sideband port controller further comprises the main MAC for communicating with the sideband endpoint circuit, wherein the output XS1 buffer is configured to receive any forwarded packets, wherein the XS2 buffer is configured to receive data packets that are not in-band data packets or sideband packets from a host into the receive backbone unit, the receive backbone unit being configured to manage movement of data from the main MAC by converting, aligning, and storing data into a line buffer, the network interface controller further comprising:

the PIA, wherein the PIA is configured to allow, at a time, the in-band packet to advance along the receive data route from a host buffer to the main MAC and further connected to allow, at a different time, the sideband packet to advance along the receive data route from a sideband buffer to the main MAC.

3. The network interface controller as claimed in claim 2, wherein the one or more other data sources further comprises a packet parser of the sideband port controller.

4. The network interface controller as claimed in claim 3, wherein the packet parser is operative to identify sideband packets of data from the sideband endpoint circuit that contain a command from the sideband port controller, the sideband port controller is operative to compile a response packet in response to the command, and the sideband port controller is operative to insert the response packet into the receive data route.

5. The network interface controller as claimed in claim 3, wherein the sideband port controller further comprises an event notification unit that is operative to compile indications into an event notification packet and further operative to pass the event notification packet to the packet parser, and the sideband port controller is operative to insert the event notification packet into the receive data route.

6. The network interface controller as claimed in claim 5, wherein the receive data route is operative to give priority to the event notification packet over the packets from the network.

7. The network interface controller as claimed in claim 1, wherein the receive data route is further operative to drop the packets that are received from the network in a case of overflow.

8. The network interface controller as claimed in claim 1, the network interface controller further comprising:
an extractor operative to extract packets from a stream of packets from the network received by the main MAC; and
wherein the main MAC is operative to forward packets that are recognized as sideband traffic to the receive data route of the sideband port controller.

9. The network interface controller of claim 1, wherein the output XS1 buffer is configured to receive any forwarded packets, wherein the XS2 buffer is configured to receive priority over the output XS1 buffer and receive data packets that are not in-band data packets or sideband packets from a host into the receive backbone unit, the receive backbone unit being configured to manage movement of data from a media access controller (MAC) by converting, aligning, and storing the data into a line buffer, the network interface controller further comprising:

the PIA, wherein the PIA is configured to allow, at a time, the in-band packet to advance along the receive data route from a host buffer to the MAC and further connected to allow, at a different time, the sideband packet to advance along the receive data route from a sideband buffer to the MAC.

10. The network interface controller of claim 9, further comprising:

an RS1X buffer and an RS2X buffer configured to receive data packets that are not in-band packets or sideband packets from the main MAC and to transmit the received data packets to a multiplexor, wherein the RS1X buffer and the RS2X buffer are within the receive backbone unit;

a scheduler configured to determine which of the RS1X buffer and the RS2X buffer is selected to transmit a next data packet to a decoder, wherein the decoder is configured to read a header of the data packets and is further configured to set a second latch in response to the header indicating that the data packets are destined for a baseboard management controller, wherein the second latch is configured to be reset when a second EOP marker is identified; and a write scheduler for transmitting a write pulse to an action machine in response to the setting of the second latch.

11. A method of receiving data in a network interface controller providing a connection for a device to a network, the network interface controller comprising a sideband port controller, the sideband port controller providing a sideband connection between the network and a sideband endpoint circuit that communicates information with the network via a sideband, the method comprising:

receiving packets from a network along a receive data route into an input of the sideband port controller for receiving the packets from the network to an output for passing the packets received from the network to the sideband endpoint circuit;

providing, in the receive data route, a receive buffer that is operative to receive the packets from the network and to pass the packets received from the network to the sideband endpoint circuit, wherein the packets received by the side band endpoint circuit are side band packets;

selecting, by a receive arbiter, between asynchronous event notification (AEN) packets within a network interface controller packet handler and the received sideband packets within the receive buffer to transmit to a baseboard management controller;

connecting, by the receive arbiter, the network interface controller packet handler to a media access controller (MAC);

determining, in response to connecting the network interface controller packet handler to the MAC, to transmit the AEN packets to the MAC;

enabling, by the AEN packets, a network connector to deliver unsolicited notifications to the baseboard management controller when a certain status change occurs within the network connector.

12. The method as claimed in claim 11, the method further comprising:

dropping from the receive data route packets from the network in a case of overflow.

13. The method as claimed in claim 11, the method further comprising:

the sideband port controller communicating with the sideband endpoint circuit with the MAC;

connecting with the network via a main MAC; and forwarding packets from the network that are received by the main MAC that are recognized as sideband traffic to the input of the receive data route.

14. The method as claimed in claim 11, the method further comprising:

reading, by a packet parser of the side band port controller, the sideband packets that are received from the sideband endpoint circuit.

15. The method as claimed in claim 14, the method further comprising:

compiling indications into an event notification packet;
passing the event notification packet to the packet parser; and
inserting the event notification packet into the receive data route and passing the event notification packet to the sideband endpoint circuit.

16. The method as claimed in claim 15, the method further comprising:

giving priority to the event notification packet over packets of data that are received from the network.

17. The method as claimed in claim 14, the method further comprising:

the packet parser identifying sideband packets from the sideband endpoint circuit containing a command from the sideband port controller;
compiling a response packet to the command; and
inserting the response packet into the receive data route.

18. The method of claim 11, wherein the AEN packets are compiled by an AEN unit, the AEN compiling comprising:

enabling, by an enable signal and within a latch, an AEN pseudo-packet of up to 16 bytes;
transmitting the enabled AEN pseudo-packet from the AEN unit to a second transmit buffer, wherein the transmitting the enabled AEN pseudo-packet from the AEN unit to the second transmit buffer further comprises:

receiving, by an arbitration logic that is within a transmit arbiter, a validating signal from the AEN unit;
receiving, by the arbitration logic, a signal from a first transmit buffer that indicates a status of the AEN unit; and
determining to pass the AEN pseudo-packet to the second transmit buffer; determining whether to connect the second transmit buffer to the first transmit buffer or to a pseudo-packet latch; and connecting, by setting a multiplexer of the transmit arbiter, the second transmit buffer to the first transmit buffer in response to determining to connect the second transmit buffer to the first transmit buffer.

\* \* \* \* \*